United States Patent [19]
Johnson

[11] Patent Number: 5,628,593
[45] Date of Patent: May 13, 1997

[54] READILY DISASSEMBLEABLE TAPPING ATTACHMENT WITH QUICK CHANGE REPLACEABLE AND MAINTAINABLE PARTS AND METHOD

[75] Inventor: Allan S. Johnson, Newport Beach, Calif.

[73] Assignee: Tapmatic Corporation, Post Falls

[21] Appl. No.: 218,257

[22] Filed: Mar. 28, 1994

[51] Int. Cl.[6] .............................. B23G 3/02; B23G 5/14; B23B 47/14
[52] U.S. Cl. ............................ 408/139; 192/51; 470/181
[58] Field of Search ...................... 408/139–142; 470/181, 182; 192/21, 48.7, 48.91, 51

[56] References Cited

U.S. PATENT DOCUMENTS

| | | | |
|---|---|---|---|
| 2,941,414 | 6/1960 | Lee | 192/51 |
| 3,999,642 | 12/1976 | Johnson | 192/21 |
| 4,014,421 | 3/1977 | Johnson | 192/48.91 |
| 4,566,829 | 1/1986 | Johnson | 408/239 R |
| 4,705,437 | 11/1987 | Johnson | 408/139 |
| 5,203,651 | 4/1993 | Johnson | 408/59 |
| 5,209,616 | 5/1993 | Johnson | 408/139 |
| 5,213,453 | 5/1993 | Eriksson | 408/57 |

*Primary Examiner*—Steven C. Bishop
*Attorney, Agent, or Firm*—Joseph R. Evanns

[57] ABSTRACT

A self-reversing tapping attachment comprises a housing including a tap holding spindle member, a forward drive member and a reverse drive member the latter two members being interchangeable with one another; at least one internal removable fastener with external access, and a base member detachably mountable on the housing, unfastening of the at least one internal fastener and the base member permitting removal of the drive members and the tap holding spindle member from the housing. A method for disassembly includes the steps of unfastening the base member, gaining access to the internal fasteners, unfastening them, and pulling out the tap spindle member.

29 Claims, 4 Drawing Sheets

READILY DISASSEMBLEABLE TAPPING ATTACHMENT WITH QUICK CHANGE REPLACEABLE AND MAINTAINABLE PARTS AND METHOD

BACKGROUND OF THE INVENTION

1. Field of the Invention

The invention relates and pertains to tapping attachments, i.e. tools which carry taps for threading holes and are driven by a driving machine or power center, and to methods for disassembling and reassembling tapping attachments.

2. Description of the Prior Art

The field of the invention and the prior art are exemplified in the field of self-reversing tapping attachments by reference to prior patents assigned to the assignee of the instant application. These include: U.S. Pat. Nos. 3,999,642; 4,014,421; 4,566,829; 4,705,437; 5,203,651; 5,209,616; and 5,213,413 and patents cited therein, all of which are hereby incorporated by reference herein. The aforesaid patents disclose and claim tapping attachments including a tap holding spindle and simultaneously rotating forward and reverse drivers, the spindle being freely floating and moveable axially with respect to the forward and reverse drivers. Under forward drive in which the tap holder spindle is driven by the forward driver, the tap threads a hole being tapped in the workpiece and thereby screws itself into the hole. Upon cessation of feed by the driving machine with retraction of the driving machine, relative axial movement results between the tap holding spindle and the driver members such that the forward drive member becomes disengaged from the tap spindle which at this point is held relatively stationary due to the fact that the tap has become fastened to the workpiece. Upon further retractive movement by the tapping machine and further relative movement, the reverse drive member becomes engaged with the tap holding spindle, causing reverse rotation thereof and thereby unscrewing the tap from the hole. In this manner, self-reversing by the tapping attachment itself as opposed to reversing by the driving machine, is accomplished. With the advent of powerful Computer Numeric Control (CNC) machining centers, self-reversing has become of greater and greater importance in that it causes reversing to occur in the tapping attachment, as opposed to requiring the driving machine to reverse its direction of rotation.

Self-reversing tapping attachments as exemplified in the above-cited patents among others, have particular parts which due to the very nature of self-reversing suffer greater wear than other parts. These parts include elements of the drivers. Replacement of worn parts in existing tapping attachments produces delays and down time. Disassembly of existing tapping attachments in itself requires appreciable time and some degree of skill.

In addition, the delays and downtime introduced by disassembling existing tapping attachments have been accompanied by a pattern of usage thereof such that the tapping attachments are used until they basically break down. At that time, they are either discarded or taken out of service for repair and maintenance. Tools for accomplishing disassembly tend to be small and easily misplaced or lost, thus introducing further delays and downtime regarding repair and maintenance.

Further, in existing tapping attachments force, and stress tend to be transmitted to the driving machine and worn parts do not perform as well in terms of reversing and initiating tapping as well as performance thereof.

Additionally, in existing tapping attachments, replacement of worn drivers normally involves replacement of both forward and reverse drivers when such replacement occurs on the occasion of breakdown due to wear.

All of the forgoing aspects of operation of existing tapping attachments tend to diminish efficiency and increase costs and downtime.

Therefore, there has been a felt but unfulfilled need for a tapping attachment which is readily disassembleable for inspection and maintenance with tools which are handy and tend not to be misplaced, which concentrates stress in a minimum number of parts, whose parts are readily replaceable and rearrangeable to continue to perform service in the tapping attachment.

SUMMARY OF THE INVENTION

A self-reversing tapping attachment comprises: tap holding spindle means; forward drive means and reverse drive means for engaging with the tap holding spindle means to impart forward and reverse rotation, respectively, thereto; gear means for transmitting drive to the forward and reverse drive means, the forward drive means and the reverse drive means being interchangeable; the foregoing elements being contained in a housing wherein means detachably affixable to, and accessible through, the housing permit removal of said elements from the housing upon detachment of said means from the housing and from inside the housing.

A method for maintaining and repairing tapping attachments includes the steps of scheduling periodic inspections predicated upon the number of tap holes made by the tapping attachment, disassembling the tapping attachment, performing maintenance and repair and reassembling the tapping attachment.

A method of disassembly in accordance with the invention includes the steps of loosening a base plate of the housing, unfastening fasteners holding the tap holding spindle in place and pulling a tap holding spindle from the bottom of the housing.

DETAILED DESCRIPTION OF A PREFERRED FORM OF THE INVENTION AND PREFERRED METHOD OF PRACTICE.

U.S. Pat. No. 5,203,651 assigned to the assignee of the instant application is hereby incorporated by reference herein. Many of the parts and components, as well as the overall system of a self-reversing tapping attachment are described and depicted in the common subject matter with the instant application. In the description that follows, only brief reference will be made to parts described and depicted in U.S. Pat. No. 5,203,651 and for purposes of brevity and clarity overlap between the instant application and the aforesaid U.S. Patent will be avoided to the extent possible.

Figure 1:
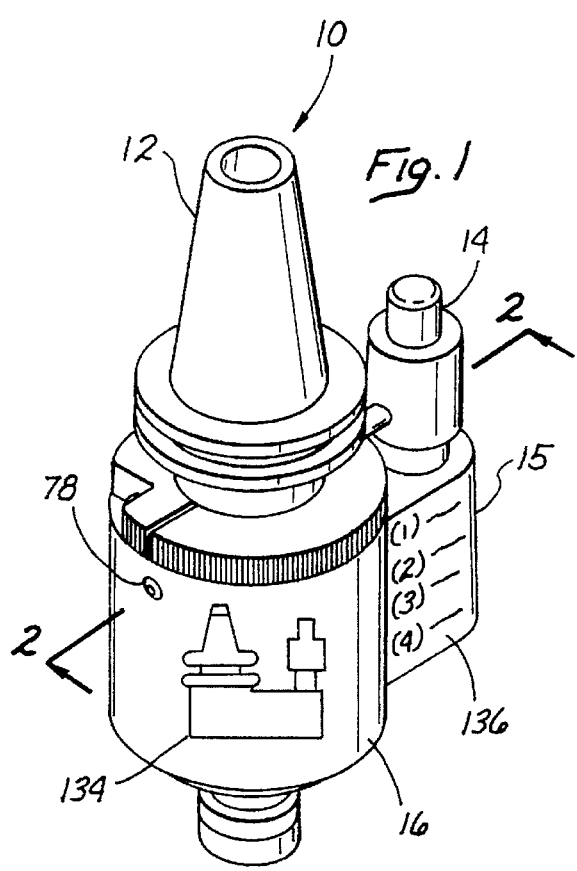
FIG. 1 is a perspective view of a tapping attachment in accordance with the invention.

As depicted in FIG. 1, a tapping attachment 10 is coupleable through a shank 12 to a source of rotational drive in the form of a driving machine (not shown). A stem 14 is disposed in and extends from a closure 15 positioned adjacent a housing 16 of the tapping attachment 10 and is connectable in conventional fashion to the driving machine to provide restraint against rotation of the housing 16 of tapping attachment 10 when connected to the driving machine and to permit rotation under particular circumstances when not so connected. Housing 16 defines a central bore 17 for receiving a drive spindle member 18. Drive spindle member 18 partially extends outwardly of housing 16. At its upper end, spindle member 18 extends into and is engaged with the member 12 for engagement with the driving machine.

Referring now also to FIGS. 2–6, inclusive, drive spindle member 18 includes a mount 20 having an insert 22, defining a central bore 24. A coolant tube 26 connects to a central bore 24 and forms a conduit for passage of coolant therethrough for the purpose of cooling tap 28 and clearing debris in the form of cuttings and the like from the work piece; a fluid chamber 25 connects to coolant tube 26. Tap 28 is carried on a tap spindle member 30 fastened to a spring member 32 by a cap 33.

Drive spindle member 18 at an upper portion thereof extends outwardly of housing 16 as noted above and comprises a lower end portion 34 within housing 16.

Lower end portion 34 of drive spindle member 18 carries at least one spline 36 engageable with a bevel gear 40. Bevel gear 40 has in a preferred embodiment thirty-five (35) teeth, the bevel gear 40 being of the general type described and claimed in U.S. Pat. No. 4,705,437 which is hereby incorporated by reference herein. Bevel gear 40 comprises an upper gear 42 and a lower gear 44 and may be integral with drive spindle 18.

A planet gear carrier 46 is mounted in housing 16. A plurality of planet gears 48 are mounted in planet gear carrier 46 and in the preferred embodiment, have twelve (12) teeth. In particular applications in accordance with the invention planet gears may have a number of teeth other than twelve. Planet gears 48 are positioned to be engageable with bevel gear 40. Thus, rotation of drive spindle member 18 produces rotation of planet gears 48.

A forward drive member 50, of generally annular configuration, defines a central bore 52. Drive member 50 carries on its radially inward wall at least one drive spline member 54. Forward drive member 50 is engageable with upper gear 42. Forward drive member 50 carries fittings 56 along its upper exterior periphery.

Spline 54 on forward drive member 50 comprises a pair of symmetrical generally arcuate contact areas 55, joined by a generally arcuate intermediate region 57.

A dampener member 60 of generally cylindrical configuration with a central bore 62 carries at least one peripheral fitting 64 and has defined at its periphery at least one slot 66 adjacent fitting 64. Dampener 60 is snugly fittable upon drive member 50 by placing slot 66 and adjacent fitting 64 against drive member fittings 56 whereby the sides of slots 66 and fittings 64 engage opposite sides of fittings 56, in a snap fit, dampener 60 being preferably composed of resilient material such as neoprene.

Figure 3:
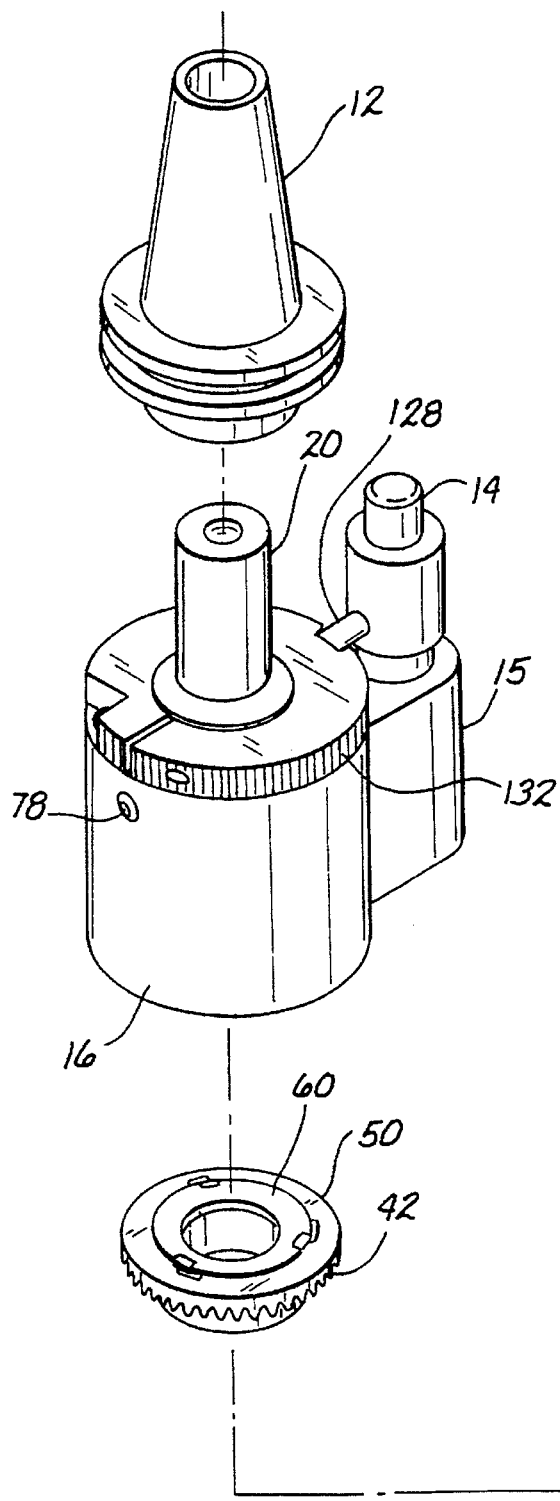
FIG. 3 is a perspective view, partially disassembled, of the tapping attachment of the tapping attachment in accordance with the invention
Figure 3:
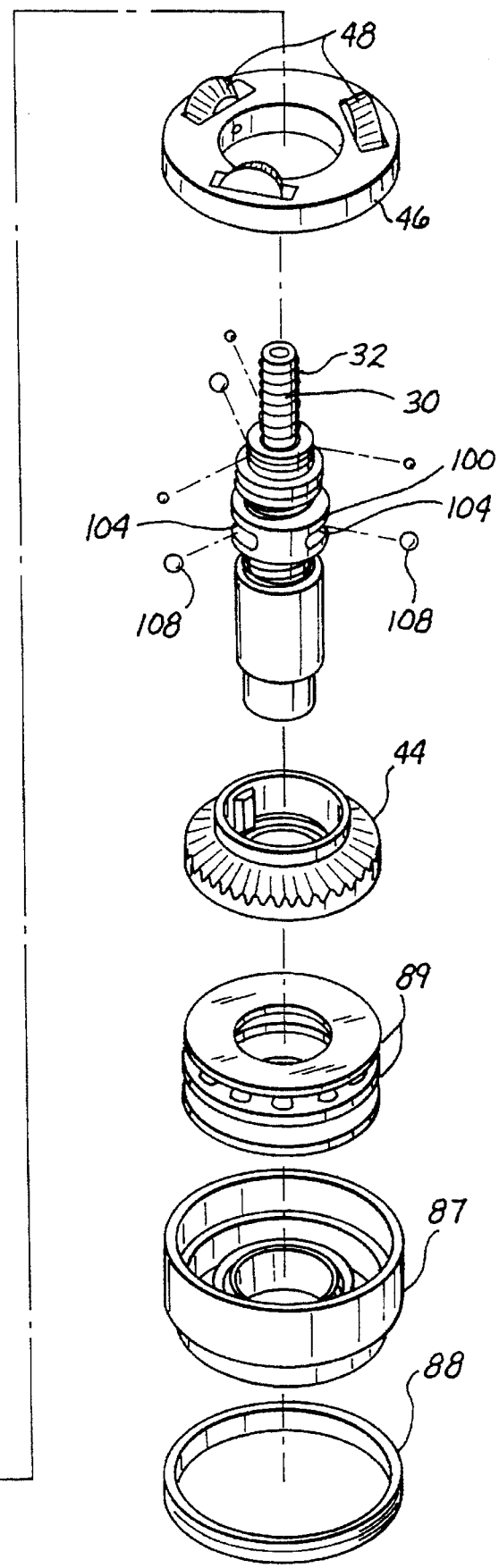

Drive member 50 defines at least one (shown in the depicted embodiment as three) upper peripheral spline 56 for engaging upper gear 42. Upper gear 42 includes at least one (shown as three in the depicted embodiment) inner slot 70 for receiving fittings 56 of driver member 50. Thus, when assembled the dampener 60, driver member 50 and upper gear 42 form a sub-assembly as best seen in FIG. 3.

Figure 5:
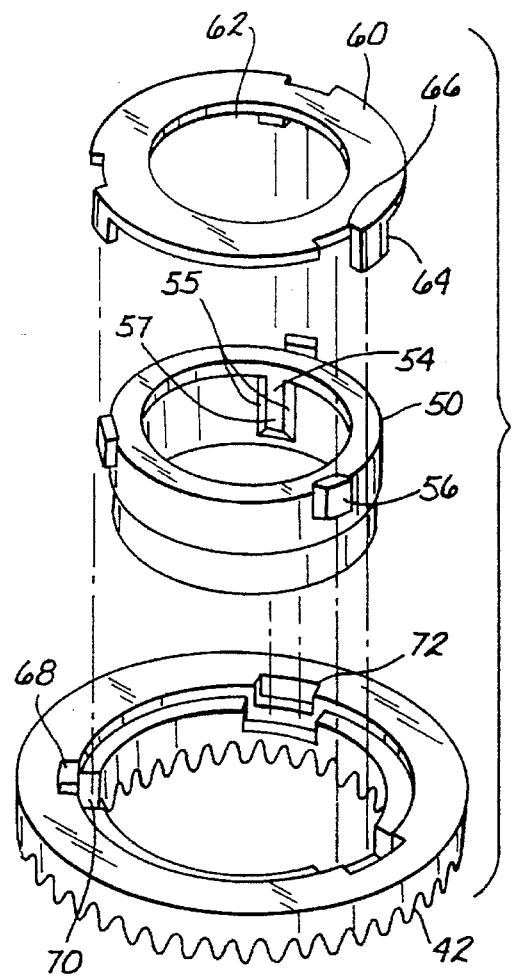
FIG. 5 is a detailed view of partially disassembled components of a tapping attachment in accordance with the invention.

As best seen in FIG. 5, peripheral slots 68 are generally rectangular with one edge shown as on the right, forming a leading edge on a clockwise rotation, having a somewhat convexly curved edge with a rounded upper portion 72.

A reverse drive member 74 is engageable with lower gear 44. Second drive member 74 is identical in all respects with first drive member 50 and the parts are interchangeable with each other. A second dampener 76 fits on driver 74 in the same manner as dampener 60 with respect to drive member 50, and together with driver 74 and lower gear 44, forms an identical subassembly to the subassembly comprising driver 50, dampener 60 and upper gear 42, with the sole exception that lower gear 44 has thirty-seven (37) teeth as opposed to thirty-five (35) teeth for upper gear 42, thus resulting in slower rotation upon engagement with planet gears 48 to the end of reducing wear in the tapping attachment 10 as is fully described in U.S. Pat. No. 4,705,437 incorporated by reference herein. In particular applications of the invention, the number of teeth on upper gear 42 and lower gear 44 may be other than as stated and the speed of rotation of the reverse and forward drive members may be substantially equal or may have any relationship at all, in accordance with the invention.

Figure 4:
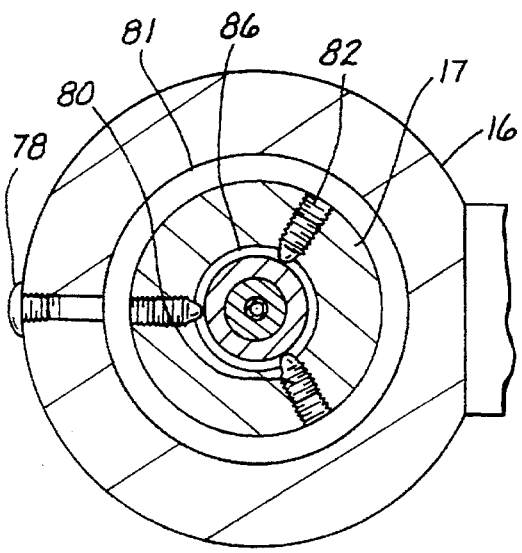
FIG. 4 is a partial sectional view through the line 4—4 of FIG. 1.
Figure 2:
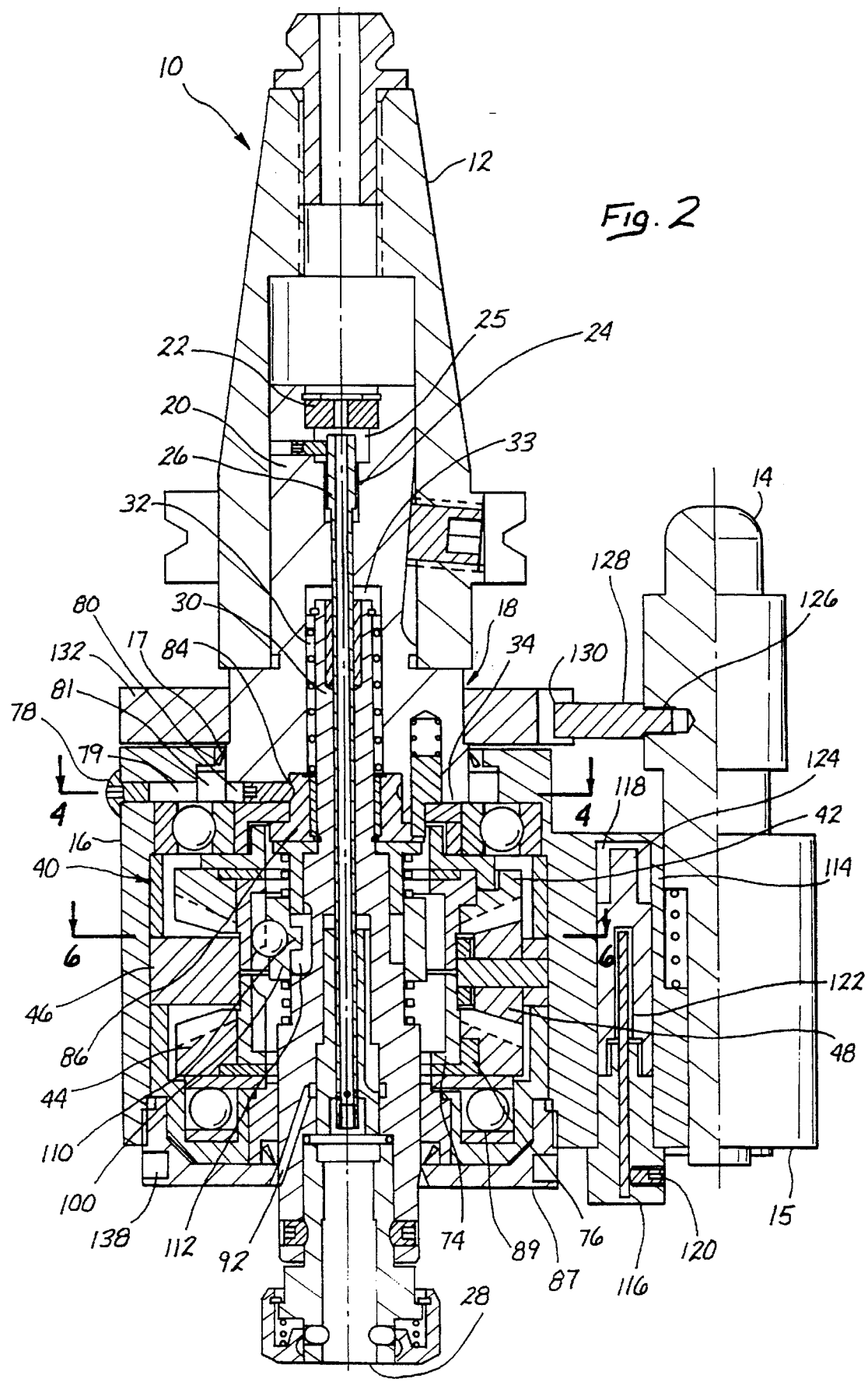
FIG. 2 is a sectional view through the line 2—2 of FIG. 1.

As best seen in FIGS. 2, 4, a button head screw 78 fastenable into an access slot 79 in housing 16 provides closure of access slot 79. Three set screws 80 extend radially inward from three (3) points at the periphery of mount 20 and have hex-shaped end slots. Set screws 80 pass through a rotary member 81 and engage a slot 84 in a spindle bushing 86. A locking ring 88 is fastened to the lower end of housing 16 holding a base member 87 thereof in place and is removable as discussed hereinbelow in connection with disassembly of tapping attachment 10. A bearing 89 is disposed adjacent lower gear 44.

At its lower end, coolant tube 26 aligns with tap 28 which contains channels (not shown) for passage therethrough of coolant from tube 26. A coolant conduit 92 provides for expulsion of unneeded coolant. The features and advantages of the coolant system herein are generally in accordance with the disclosure and claims of U.S. Pat. No. 5,213,453 assigned to the assignee of the instant application, which patent is hereby incorporated by reference herein.

A drive sleeve 100 within housing 16 is generally cylindrical having a central bore 102 and defines at its periphery at least two slots 104 for accommodation and movement wherein of drive balls 108. Drive sleeve member 100 includes at least one drive spline 110 engageable with tap spindle member 30, which carries at least one drive pin 112. Slots 104 are of generally ellipsoidal configuration. Drive spline 110, drive pin 112 and slots 104 are in accordance with the disclosure and claims in U.S. Pat. No. 5,209,616 assigned to the assignee hereof and incorporated by reference herein. As disclosed in detail in U.S. Pat. No. 5,209,616 the configuration and relations of the above-described parts tend to minimize wear and shock in operation.

A closure 114 fastened to housing 16 contains an access tool 116 removably secured in a threaded holding slot 118 defined in closure 114. Access tool 116 comprises a hex-head screwdriver 120 removably secured in and extending from an aperture 122 defined in access tool 116. Access tool 116 further comprises a key 124 removably secured to screwdriver 120.

Stem 14 defines a slot 126 for receiving and movably securing an arm 128 held at its opposite end in a recess 130 defined in a movable collar 132 at the upper end of housing 16. Collar 132 is attached by means (not shown) to mount 20. A spring 134 in closure 15 biases stem 14 upwardly. A slot (not shown) in housing 16 is aligned with recess 130.

A diagram 134 of tapping attachment 10 is inscribed on the periphery of housing 16 in conjunction with instructions 136 inscribed on closure 15 concerning disassembly of tapping attachment 10. Other than the access tool 116 and the securement thereof, the arrangement described in this section is generally in accordance with U.S. Pat. No. 4,566,829 assigned to the assignee of the present application, and incorporated by reference herein.

In operation, rotation is transmitted from the driving machine to forward driver 50 and to reverse driver 74 through bevel gear 40 and planet gears 42, 44, respectively.

Figure 6:
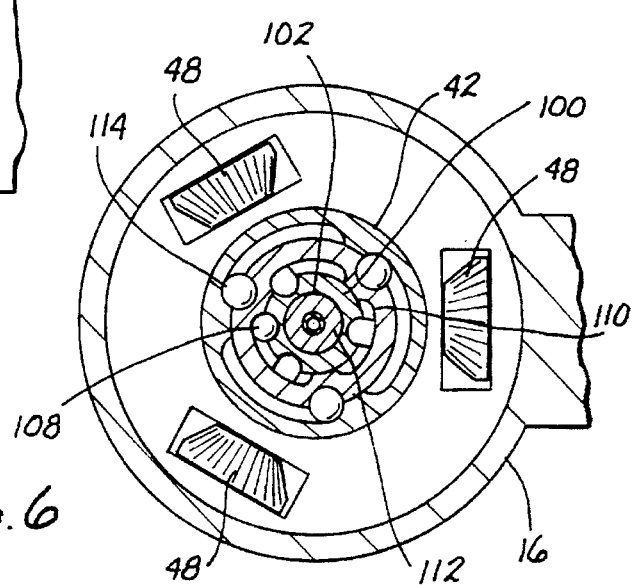
FIG. 6 is a sectional view through the line 6—6 of FIG. 1.

In forward drive, splines 56 on drive member 50 engage with splines 72 of gear 42, through balls 114, as depicted in FIG. 6. As a result of the edge configuration of spline 72 and due to the presence of dampener 60, driver 50 and balls 114 experience less shock and wear than in existing devices. Driver sleeve 50 is rotated in the forward direction and as a result, drive splines 54 engage balls 108 on drive sleeve 100 which in turn causes engagement with drive pins 112 of spindle 30.

Coolant is provided during tapping from the driving machine 12 via the conduit 26. When the hole has been threaded to the selected depth and the tap is to be withdrawn from the hole, the tapping attachment 10 is raised by the driving machine. At this point, the tap is embedded in the hole and removal is most conveniently accomplished by reversing the tap rotation.

Accordingly, when the tapping attachment is raised the spindle 18 and tap remain in the hole, the forward drive member 50 and reverse drive member 74 moving axially upwardly relative to the spindle member 30 and tap 28.

As a result of the aforesaid axial movement, drive sleeve 100 engages reverse drive member 74; thereby causing reverse rotation of the spindle 30 and tap 28, enabling efficient withdrawal of the tap 28 from the hole. As in forward drive, driving engagement is cushioned due to the configuration of slots 104, the presence of the dampener 76 and the shape of the edges of the drive splines on the reverse driver 74 identical to forward driver 50.

Figure 7:
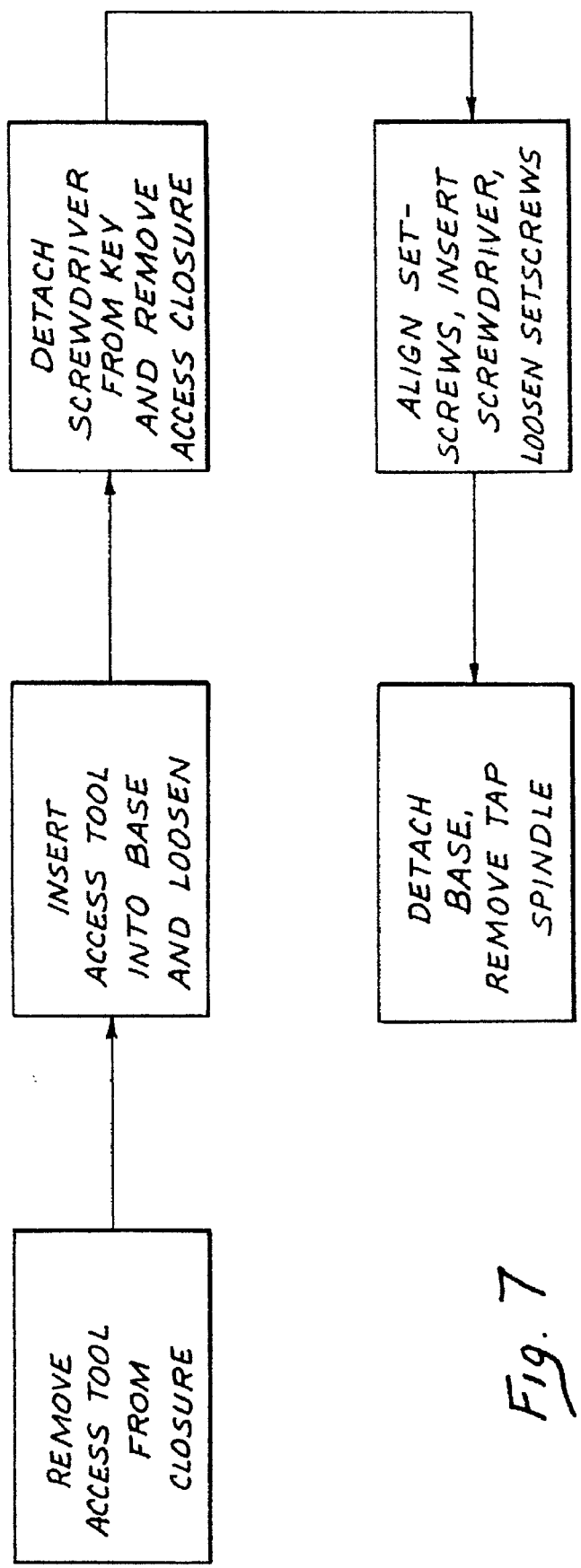
FIG. 7 is a schematic depiction of a method for disassembling and reassembling a tapping attachment in accordance with the invention.

A further significant advantage of the invention is its ready disassembleability and maintainability. A method for disassembling and reassembling tapping attachments in accordance with the invention is depicted in FIG. 7. As a first step, access tool 116 is removed from closure 15 by being unscrewed therefrom by manual manipulation. Key 124 is then inserted into a slot 138 in locking ring 88, and given a counter-clockwise turn to loosen the locking ring 88.

Screwdriver 120 is then detached from key 124. Screwdriver 120 is then employed to unfasten screw 78, exposing access slot 79. Screwdriver 120 is then placed into slot 79.

Tapping attachment 10 is then manually supported generally with its longitudinal axis horizontal so that screwdriver 120 points sufficiently downward to be held therein by gravity. With the other hand, the user compresses stem 14 so that arm 126 is displaced from its restraining position in slot 130 thereby freeing collar 132 (and attached mount 20) to rotate. With a touch of a finger from the hand holding stem 14 down, collar 132 is caused to rotate slightly until a set screw so rotates into alignment with the hex-head screwdriver 120, which then drops into the hex-shaped receptacle at the outer end of screws 80.

The user then shifts hands so that the hand previously employed to support the housing 16 is employed to manipulate screwdriver 120 to unscrew set screws 80; this operation is performed three times (once for each set screw 80). At this time, the screwdriver 120 may be replaced inside tool 116, which is then set aside. Lock ring 88 is then rotated counterclockwise sufficiently to remove it, thereby permitting removal of 87; spindle 30 is then pulled out from housing 16.

In the partially disassembled condition, routine maintenance and repair including lubrication may be performed upon tapping attachment 10. Forward drive member 50 and rear drive member 74 may be checked for wear. An additional advantage of the invention is that due to the nature of tapping (whereby forward drive is more wearing than reverse due to resistance of the workpiece), in most applications reverse drive members wear at approximately one-third the rate of forward drive members. Thus, when a worn forward drive member is taken out of service it may be replaced by a reverse drive member in much the same manner as worn front tires of an automobile may be replaced by less worn rear tires. This is attributable to the ready disassembleabilty feature of the invention together with the interchangeability of the forward and rear driver members.

To reassemble, all that is necessary is to align the drive elements in the manner illustrated, as in FIG. 3, refasten set screws 80 and secure locking ring 88 and base 87. Access tool 116 is then reassembled and secured in slot 118 for future use.

Because of the above-described configuration with numerous provisions for damping and cushioning engagement of the various driving elements with one another, the brunt of shock and wear is primarily upon the readily replaceable elements, the forward drive member 50 and the reverse drive member 74. In this manner, efficient and economical operation is achieved in that when the forward drive member and the reverse drive member are worn, they are simply replaced, whereas other elements in the tapping attachment 10 need not be replaced or repaired because most of the wear has been focused upon the driver members 50, 74.

The capability of ready repair, maintenance, and replacement of worn parts provided by the invention permits efficient operation in a further particular, namely that tapping attachments can be scheduled for periodic repair and maintenance in the same manner as other machinery such as automobiles. In existing tapping devices, lacking ready disassemblability and interchangability of parts, the tapping attachments are used until they break down, at which time they are sent out for repair or discarded. By employing tapping attachments in accordance with the invention, and utilizing experience in tapping with particular work pieces and/or particular equipment, a reasonable approximation can be made as to the number of tapped holes which the driver elements will accomplish before exhibiting wear or breakdown. Thus, after a scheduled number of tapped holes, the equipment can be quickly disassembled, checked, maintained, and worn elements replaced, if necessary. This avoids the tendency to use-to-breakdown which characterizes operations with existing tapping attachments.

In this manner, a readily disassembleable tapping attachment with conveniently maintainable and replaceable parts, with reduced wear, and with wear and stress borne primarily by readily replaceable parts, has been provided in accordance with the invention; also provided is a method for disassembling and maintaining such a tapping attachment.

The foregoing is descriptive and illustrative, the invention being defined only by the appended claims interpreted in light of the specification.

What is claimed is:

1. A self-reversing tapping attachment comprising:
   (a) tap spindle means for holding a tap and rotatable for accomplishing tapping;
   (b) forward drive means engageable with said tap spindle means to impart rotation to said tap spindle means for accomplishing tapping;
   (c) reverse drive means engageable with said tap spindle means to impart rotation to said tap spindle means in an opposite direction to rotation imparted by said forward drive means;
   (d) gear means for transmitting drive to said forward drive means and said reverse drive means, said tap spindle means being moveable back and forth along the direction of tapping relative to said forward drive means and said reverse drive means; and
   (e) dampener means engageable with at least one of said forward drive means and said reverse drive means.

2. The invention as set forth in claim 1 wherein said dampener means is engageable with said forward drive means and said reverse drive means.

3. The invention as set forth in claim 1 wherein said forward drive means and said reverse drive means are interchangeable.

4. The invention as set forth in claim 1 wherein said gear means produces substantially simultaneous rotation of said forward drive means and said reverse drive means at different speeds.

5. The invention as set forth in claim 4 wherein said forward drive means produce rotation at a greater speed than the speed of rotation produced by said reverse drive means.

6. The invention as set forth in claim 1 wherein said gear means produces substantially simultaneous rotation of said forward drive means and said reverse drive means at substantially equal speeds.

7. The invention as set forth in claim 1 further including a housings containing said tap spindle means, said forward drive means, said reverse drive means and said gear means; and further including first detachable securement means and second detachable securement means, said first detachable securement means being detachably mounted upon said housing and said second securement means being mounted within said housings and accessible from outside of said housings, said first detachable securement means and said second detachable securement means being engageable with said means contained in said housing such that upon detachment of said first detachable securement means and said second detachable securement means, said contained means are removable from said housing whereby said contained means are readily repaired, replaced and maintained.

8. The invention as set forth in claim 1 wherein said dampener means is carried by said forward drive means to reduce wear thereof during operation.

9. The invention as set forth in claim 1 wherein said dampener means is carried by said reverse drive means to reduce wear thereof during operation.

10. The invention as set forth in claim 1 wherein said gear means includes means for engaging said forward drive means in driving engagement and configured to cushion shock upon such engagement.

11. The invention as set forth in claim 1 wherein said gear means includes means for engaging said reverse drive means in driving engagement and configured to cushion shock upon such engagement.

12. The invention as set forth in claim 1 further including drive sleeve means for engaging said tap spindle means to impart rotation thereto and movable to engage said forward drive means and said reverse drive means to be driven thereby, said drive sleeve means including means for cushioning shock due to engagement with said forward drive means, said reverse drive means and said tap spindle means.

13. The invention as set forth in claim 12 wherein said tap spindle means includes means for engaging in driving engagement with said drive sleeve means, said means being configured to reduce shock upon engagement between said drive sleeve means and said tap spindle means.

14. The invention as set forth in claim 1 further including a tool member storable in said tapping attachment for disassembling said tapping attachment.

15. A self-reversing tapping attachment comprising:
   (a) a housings;
   (b) gear means contained within said housing and connectable to a source of rotational power;
   (c) a forward drive member contained within said housing and engageable with said gear means;
   (d) a reverse drive member contained within said housing and engageable with said gear means;
   (e) a tap holding spindle member within said housing movable relatively to said forward member and said reverse drive member to be engageable therewith;
   (f) first securement means detachably mountable on said housing; and second securement means detachably mountable in said housings for holding and containing said forward drive member, said reverse drive member, gear means, and said tap holding spindle member within said housings such that upon detachment of said first removable securement means and said second securement means, said gear means, said forward drive member, said reverse drive member, and said tap holding spindle member are removable from said housing.

16. The invention as set forth in claim 15 wherein said first securement means includes a base member including means for affixing said base member to said housings.

17. The invention as set forth in claim 15 wherein said second securement means includes at least one set screw holding said tap holding spindle member in said housing.

18. The invention as set forth in claim 15 wherein said forward drive member and said reverse drive member are substantially identical.

19. The invention as set forth in claim 15 wherein said forward drive member and said reverse drive member are interchangeable.

20. The invention as set forth in claim 17 wherein said housings defines an access opening for access to said at least one set screw and further including movable means defining at least one aperture, said movable means being movable to align said at least one aperture with said at least one set screw and with said access opening, to provide access from outside said housings member to said at least one set screw.

21. The invention as set forth in claim 20 wherein said base member includes access tool engaging means for engaging with an access tool for loosening and tightening said base member, and further including an access tool member for engaging with said access tool engaging means on said base member to loosen and tighten said base member and for engaging said at least one set screw to loosen and tighten said at least one set screw.

22. The invention as set forth in claim 21, wherein said access tool member is storable in said tapping attachment.

23. The invention as set forth in claim 20 wherein said access tool engaging means in said base member comprises a slot and wherein said access tool member includes a separate element for engaging said slot in said base member and a separate screwdriver element for engaging said at least one set screw.

24. The invention as set forth in claim 23 wherein said screwdriver element of said access tool member is securable for storage in said element for engaging said slot in said base member.

25. The invention as set forth in claim 20 further including a control member for controlling movement of said rotary access means said control member being movable between a first position wherein said housings is prevented from rotating and a second position wherein said housing is free to rotate.

26. The invention as set forth in claim 15 wherein instructions for disassembly of said tapping attachment are depicted on the exterior of said tapping attachment.

27. A method for disassembling a tapping attachment having a housing with a detachable base member and internal fastener means for retaining a tap holding spindle member comprising the steps of:

(a) loosening said base member;

(b) unfastening said internal fastener means;

(c) removing said base member;

(d) pulling said tap holding spindle from said housings.

28. The method set forth in claim 27 wherein said tapping attachment includes internal access means providing external access to said internal fastener means and external control means manipulatable to control said internal access means, wherein the step of unfastening said internal fastener means includes the step of manipulating said external control means to cause said internal access means to provide access to said internal fastener means.

29. The method set forth in claim 27 further including the step of scheduling said tapping attachment for disassembly for periodic repair and maintenance by reference to the number of tap holes made by said tapping attachment.

* * * * *